May 4, 1937.  M. F. JUDD  2,079,173
ENDLESS CLUTCH FACING AND METHOD OF MANUFACTURE OF THE SAME
Filed Oct. 3, 1934   3 Sheets-Sheet 1

Inventor:
Morton F. Judd
By  Lee J. Gary
  Attorney

May 4, 1937.  M. F. JUDD  2,079,173
ENDLESS CLUTCH FACING AND METHOD OF MANUFACTURE OF THE SAME
Filed Oct. 3, 1934  3 Sheets-Sheet 2
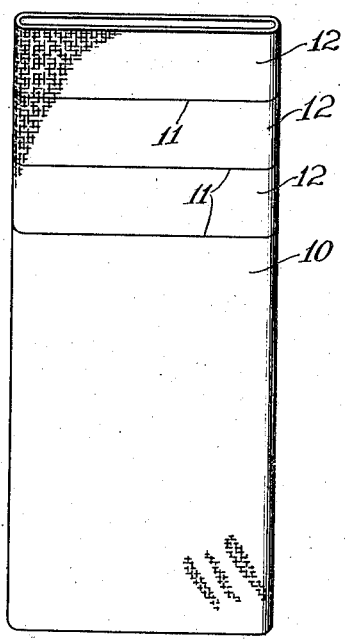
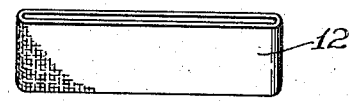
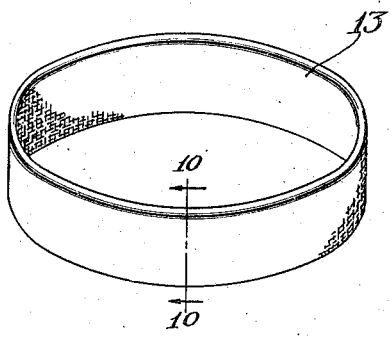
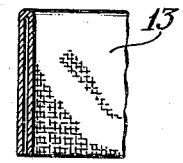
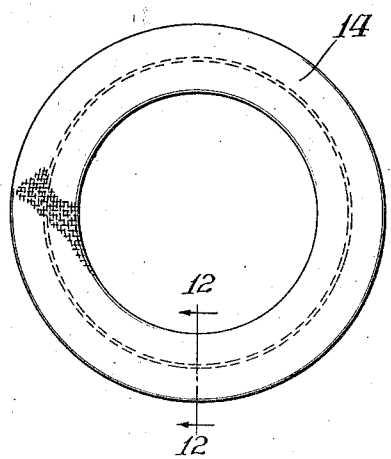
Inventor:
Morton F. Judd
By Lee J. Gary
Attorney May 4, 1937.  M. F. JUDD  2,079,173
ENDLESS CLUTCH FACING AND METHOD OF MANUFACTURE OF THE SAME
Filed Oct. 3, 1934  3 Sheets-Sheet 3

Inventor:
Morton F. Judd
By Lee J. Gary
Attorney

Patented May 4, 1937

2,079,173

UNITED STATES PATENT OFFICE 2,079,173

ENDLESS CLUTCH FACING AND METHOD OF MANUFACTURE OF THE SAME

Morton F. Judd, Stratford, Conn., assignor to Raybestos-Manhattan, Inc., Passaic, N. J., a corporation of New Jersey Application October 3, 1934, Serial No. 746,707

8 Claims. (Cl. 154—2)

This invention relates to improvements in clutch facings and a method of making same, and refers specifically to improvements in woven clutch facings of the endless type and a method of manufacture of such clutch facings.

Clutch facings of the woven type have heretofore been manufactured by three general methods. Briefly described these methods are as follows:

1. Asbestos yarn, either with or without wire cores referred to as metallic yarn or non-metallic yarn, is woven on a loom into a tape of the proper thickness and width. This tape is then removed from the loom and dried at a relatively low temperature, say up to 225° F., to remove any mixture, either hygroscopic or that which may have been added during the weaving operation for dust prevention or other purposes. The dry tape is then immersed in a saturating liquid and after a short air drying to remove excess solvent, it is then fed through a guiding slot in a vertically stationary but horizontally movable head to a mandrel revolving in a lathe. In this manner the tape is coiled around the mandrel so as to stand the tape on edge around the outside circumference of the mandrel. The mandrel-wound tape is then baked in an oven sufficiently to harden the coil and the tape is then removed from the mandrel. This spiral of coiled tape is then slit and both ends of the cut tape are joined and wire staples inserted to form a ring. The ring is then pressed or flattened by suitable means and sent through finishing operations of sanding both sides to obtain proper thickness, boring and turning of inside and outside circumferences to obtain finished dimensions.

2. The second method in present use of producing clutch facings comprises weaving from metallic asbestos yarn or non-metallic yarn a relatively wide fabric, either single ply or multi-ply, saturating said fabric with an impregnated solution, drying off excess solvent and baking in an oven to a desired state of cure. From the cured cloth, rings of desired finished dimensions may be stamped out by means of a suitable die. The centers and outsides are waste, and the proportion of usable to unusable area is ordinarily about 1 to 3. This method is particularly adaptable to the production of clutch facings having a rubber binder. Single ply cloth may be passed through a set of calender rolls and a rubber compound frictioned thereon. Several plies of the rubberized cloth are then laminated and vulcanized in a hot hydraulic press forming a sheet of sufficient thickness to obtain the thickness of the desired clutch facing. The facings are then cut out of the plied cloth by means of a die and finished to thickness by sanding on both sides. The waste ratio is similar to the previously described method, namely, about 1 to 3.

3. The third method which is used to manufacture rubber bonded facings comprises the weaving of a single ply cloth frictioned with a rubber compound and cut into strips in widths which are multiples of the desired finished width. The strips are then folded in such a manner as to produce a resultant strip having approximately the width of the wall of the finished facing and a thickness slightly in excess of the thickness of the finished ring. This folded strip is then passed through a rolling device comprising two conical rolls, and in passing through these rolls the strip is formed into circular shape. The circular tape is then wound on a mandrel similar to the method described in conjunction with the first hereinbefore described method and the procedure from thence on is likewise the same.

It will be seen that there are certain disadvantages in clutch facings made by each of the above methods. In the methods indicated 1 and 3, the rings will contain a set of metallic staplings which are undesirable. Also, in winding the rings upon the mandrel, the outer portion of the periphery of the stock is stretched and there exists in the finished ring a difference in density and strength between the inner and outer portions of the finished facing. The main disadvantage of rings made by the second method is an economical one, that of waste material. As can be readily appreciated there is a loss of the disks obtained on cutting within the inside circumference of the ring and a loss resulting from the cutting outside the outer circumference. This loss varies with the size of the ring cut and may run as high as 80% of the original cloth used.

The present invention overcomes the disadvantages of rings heretofore made by the above described methods in that the finished ring does not contain staples and the loss of stock in manufacturing the ring is negligible.

The objects and advantages of my invention will be apparent from the accompanying drawings and following detail description.

In the drawings, Fig. 1 is a fragmentary face view of asbestos cloth from which the clutch ring is constructed.

Fig. 7 is a perspective view of a tube of woven asbestos, from which material a clutch ring is constructed by a method comprising a modified form of my invention.

Fig. 8 is a perspective view of a unit strip cut from the tube shown in Fig. 7.

Fig. 9 is an enlarged perspective view of the unit strip in folded position.

Fig. 10 is a sectional view taken on line 10—10 of Fig. 9.

Fig. 11 is a face view of the clutch ring formed by pressing the cylinder shown in Fig. 9.

Fig. 12 is a sectional view taken on line 12—12 of Fig. 11.

Figure 1:
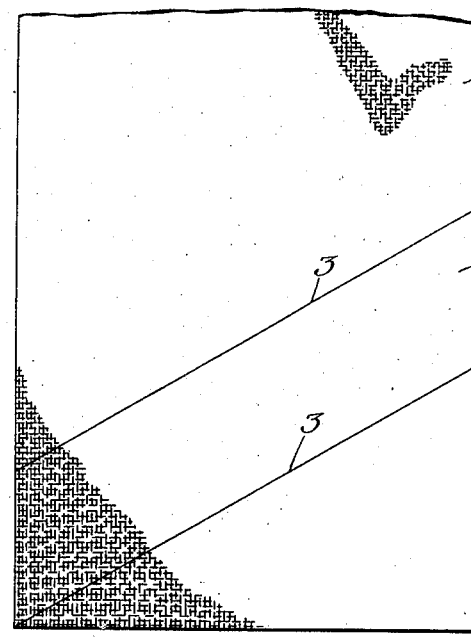

Referring in detail to the drawings, 1 indicates a fragmentary portion of a strip of cloth comprising woven asbestos yarn or other material from which clutch rings have heretofore been constructed. The cloth 1 may be initially passed through a calender of the three roll type and a rubber compound or other material which will give suitable frictional characteristics is frictioned onto the cloth. The web of cloth 1 may be cut on the diagonal to provide a series of unit strips 2, the strips being cut along the lines 3 shown in Fig. 1. In cutting, lines 3 may make an angle of 30 to 45 degrees with the warp yarn comprising the cloth. The width of the strip determines the thickness of the finished facing and, consequently, varies depending upon the thickness desired.

Figure 2:
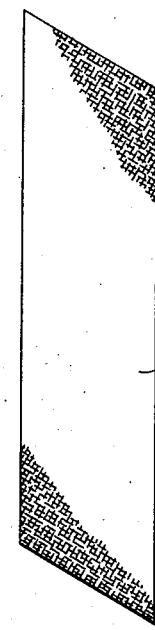
Fig. 2 is a face view of a unit strip cut from the cloth shown in Fig. 1.
Figure 3:
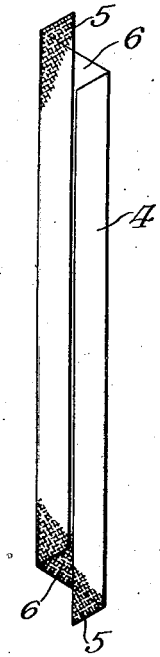
Fig. 3 is a similar view showing the unit strip folded.

The strips 2 comprise parallelograms having ends disposed at an angle of 30 to 45 degrees with the length of the strip as shown best in Fig. 2. Each of the strips 2 cut from the web 1 may be folded longitudinally so as to provide a double ply unit 4, the longitudinal edges of the strip abutting at the center of the folded strip 4. The ends of the strip 4 may be butt jointed, the projecting triangular portions 5 at each end of the strip 4 being adapted to be disposed in the triangular shaped recesses 6 at each end of the strip.

Figure 4:
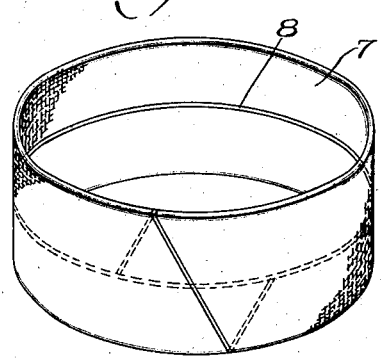
Fig. 4 is a perspective view of the folded strip, the ends being joined to form a cylinder.
Figure 5:
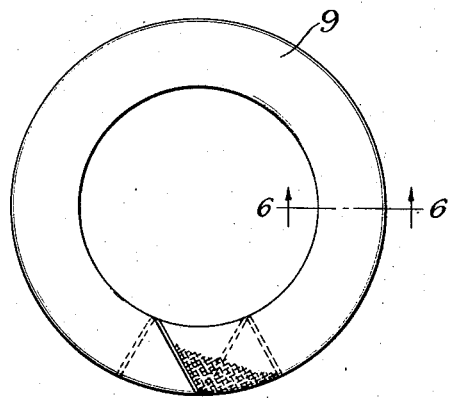
Fig. 5 is a face view of the clutch ring formed by pressing the cylinder shown in Fig. 4.

In so joining the ends of strip 4, a cylinder 7 is formed having the longitudinal edges at the inner portion of the cylinder as shown at 8 in Fig. 4. In view of the fact that the main body portion of the strip 4 is double ply, the entire thickness of the cylinder 7 will be double ply, the plies at the joining ends being made up of the thickness of triangles 5 and 6. The opposed faces of the overlapping portions formed by the projecting triangular portions 5 disposed in the triangular-shaped recesses 6, having been previously frictioned as aforesaid, adhesively unite to retain the strip 4 in cylindrical form as illustrated in Fig. 4. In the event that the adhesive qualities of the frictioning material are not sufficient to obtain the necessary adhesion, rubber cement "bakelite" varnish or the like may be used.

Figure 6:
Fig. 6 is a sectional view taken on the line 6—6 of Fig. 5.
Figure 13:
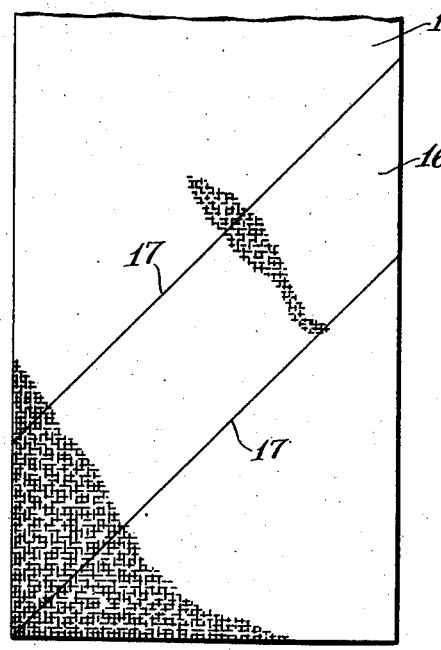
Fig. 13 is a fragmentary face view of a web of asbestos cloth from which a modified form of a clutch ring may be constructed.

The walls of the cylinder 7 may then be folded along the line of the joining longitudinal edges 8, the fold being so made that said longitudinal edges are confined or are disposed adjacent the inside of the fold as shown best in Fig. 6. Upon folding the cylinder 7 in the manner described, the cylinder is flattened, thus providing a flat, endless ring 9 having relative uniform thickness.

The rings 9 thus constructed may be coated with a thin layer of talc and vulcanized in a mold in a hydraulic press at a temperature of approximately 300 to 400 F., thereby forming the rings into a unitary structure. If desired the rings may be subjected to a pressing operation of relatively short duration; removed from the mold and assembled into a relatively tight pack between two metal plates (not shown) and cured to desired characteristics. The rings, after curing, may be sanded to desired thickness.

The clutch ring hereinbefore described is one which requires, in its final form, four plies of cloth. It may be desired to produce a clutch ring having more or a fewer number of plies in which case the operations of folding the strip 2 may be varied, the longitudinal edges of the strip appearing either at the center or at an edge of the outside circumference of the ring.

The advantages inherent in the rings constructed according to my invention comprise:

1. The rings are endless, that is, no metal staplings are necessary. The joint produced is capable of being so vulcanized throughout that it is substantially impossible to locate on visual inspection. The joint is exceptionally strong and exhibits no tendency to part, either in the application to the clutch plate or in service.

2. The facings are of uniform density throughout, the strip being formed into a ring without any excessive stretching of the outer portion of its circumference due to the bias cut. By my method of manufacture there is very slight distortion of warp and filler yarn.

3. In view of the fact that the waste of material involved in manufacturing the clutch ring 9 is substantially negligible, the method of manufacture has high commercial appeal.

Referring particularly to Figs. 7 and 12 inclusive, a slight modification of my invention is illustrated. A tube 10 comprising asbestos yarn may be woven on a loom by weaving a two ply fabric and omitting in the weave the binder threads which usually serve to unite the two plies into a unitary structure. The flattened tube 10 may then be passed through a calender of the two roll type and a rubber compound or the like may be frictioned thereon. If desired, the rubber compound mixed with a solvent may be brought to the consistency of dough and a quantity thereof may be inserted in the open end of the tube. The tube may then be run through a two roll, even speed calender and the rubber compound may be squeezed from the inside to the outside of the tube, or the tube may be impregnated, if desired, by merely dipping sections of the tube into a rubber compound solution. The rubber frictioned tube may then be cut along lines 11 providing a plurality of unit tubes 12, the height of the tubes 12 depending on the thickness desired in the finished clutch facing.

The unit tubes 12 may then be folded along a circumferential line thereby providing a multiply cylinder 13, the number of plies making up the cylinder 13 depending upon the number of times the unit cylinder 12 was folded. The cylinder 13 of folded cloth may then be flattened to a ring 14 by displacing the walls of the cylinder from a vertical plane to a horizontal plane, as indicated from the sectional view shown in Fig. 12. The ring 14 may then be vulcanized by any of the well known methods.

The tube 10 instead of being woven may be formed upon a braiding or knitting machine. The remaining operations are carried out in a manner similar to those performed upon the woven tube, the folding operations being the same whether the tube is produced by weaving or braiding.

Referring particularly to Figs. 13 to 19 inclusive, 15 indicates a fragmentary portion of a web of cloth which may comprise woven asbestos yarn or other material from which clutch rings have heretofore been constructed. The web 15 may be initially passed through a calender and a rubber compound or other material which will impart suitable frictional characteristics thereto is frictioned on the cloth. The web 15 in all of its aspects may be similar to web 1. The web 15 may be cut on the diagonal to provide a series of unit strips 16, the strips being cut along lines 17 shown in Fig. 13. In cutting, lines 17 may make an angle of 30 to 45° with the warp yarn comprising the web 15, and the width of the strip 16 is determined by the desired width and thickness of the finished clutch facing which is to be constructed therefrom.

Figure 14:
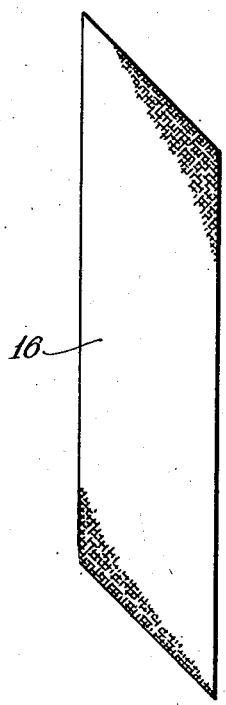
Fig. 14 is a face view of a unit strip cut from the web shown in Fig. 13.
Figure 15:
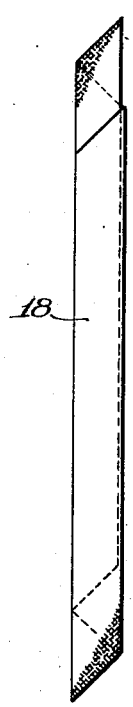
Fig. 15 is a similar view showing the unit strip folded.
Figure 16:
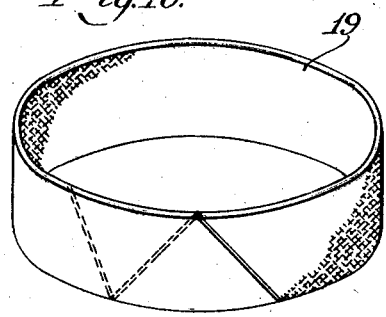
Fig. 16 is a perspective view of the folded strip, the ends being joined to form a cylinder.
Figure 17:
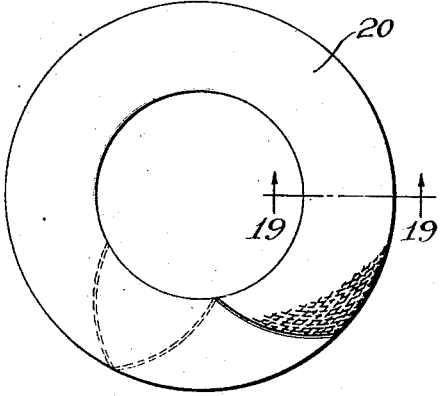
Fig. 17 is a face view of the clutch ring formed by pressing the cylinder shown in Fig. 16.
Figure 18:
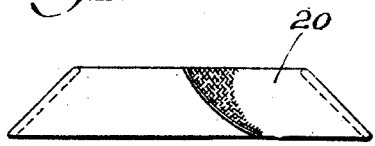
Fig. 18 is a side elevational view showing the form of the clutch ring intermediate the cylindrical form and the disk form.
Figure 19:
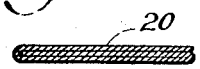
Fig. 19 is a sectional view taken on the line 19—19 of Fig. 17.

Each of the strips 16 cut from the web 15 may comprise parallelograms having their ends disposed at an angle of 30 to 45° with the length of the strip as shown best in Fig. 14. The strips may be folded longitudinally into three sections so as to form a triple ply unit 18. After the folding operation the ends of the unit 18 may be joined in such a manner as to form a cylinder 19 of said unit, the ends of the unit being so disposed with respect to each other as to form cylinder 19 of a three ply construction throughout its entire circumference. Similar to the formation of the cylinder 7 the ends of unit 18 when joined to form the cylinder 19 may be coated with an adhesive material such as rubber cement, bakelite, varnish or the like in the event that the adhesive qualities of the frictioning material are not sufficient to obtain the necessary bond.

Cylinder 19 may then be passed through a set of co-acting conical rolls and the walls of said cylinder may be gradually deformed in such a manner as to finally be disposed in a single plane. In so rolling the walls of cylinder 19, the cloth comprising the cylinder is redistributed with respect to its normal structure, that is, the cloth adjacent the base of the conical rolls is slightly stretched and the cloth adjacent the apex of the rolls is slightly compressed. However, in view of the fact that this operation takes place more or less gradually, the inner periphery of the frustroconical intermediate product 20 is in material more dense than the material adjacent the outer periphery of the frustro-conical element 20. In other words, the operation is so performed as to permit the stresses within the body of the cloth to redistribute themselves. As the rolling operation continues the walls of the cylinder 19 assume the position shown in Fig. 18 and are gradually formed as a flat disk as indicated at 20 in Fig. 17. The disk 20, as stated, has a substantially uniform density through its entire area and is formed as an endless clutch ring of three ply thickness.

In cutting strips 16 from web 15, as hereinbefore mentioned, the width of the strips are dependent upon the thickness desired in the finished ring 20 and also upon the desired radial dimension of the finished ring. For instance, to produce a finished clutch facing having an outside diameter of 9¾ inches, an inside diameter of about 5½ inches, and a radial dimension of about 2⅛ inches, a strip 16 of 6¾ inch width may be used. The cylinder 7 thus formed will have a height slightly greater than the radial dimension of the finished ring. However, a portion of the width of the strip is utilized in folding to form unit 18 and, consequently, the cylinder will not be as great in height as the dimensions seem to indicate. Moreover, when the cylinder is passed through the conical rolls and is formed into the finished flattened ring, the material undergoes a stretching and contracting action and a proportion of the excess height of the cylinder is dissipated thereby producing a ring having a radial dimension lesser than the height of the cylinder. During the rolling operation the outer circumference of the ring is slightly stretched and the inner circumference thereof is slightly contracted. However, this stretching and contracting action does not materially disturb the diameter of the ring and the density thereof is substantially constant throughout and for all practical purposes may be considered as being uniform.

In the methods hereinbefore described, it is mentioned that the rubber compound is frictioned upon the cloth. However, it is to be understood that the rubber compound may be spread or applied to the cloth by any of the methods known to the art. In addition, it is to be understood that other binders than rubber or rubber compounds may be used, such as drying oils, drying oil resin combinations, asphaltic materials or the like. Furthermore, if desired, the style of the weaving in case the web 1 or cylinder 10 is woven may be varied from a straight weave, for instance, to a twill weave in order that the folding operations may be facilitated.

I claim as my invention:

1. A method of making friction clutch rings which comprises, forming a cylinder of textile material comprising essentially asbestos yarn, folding said textile material along a circumferential line, flattening the folded cylinder to form an annular ring so as to dispose the edges on one flat surface intermediate the inner and outer defining edges of the ring and curing the ring thus formed.

2. A method of making friction clutch rings which comprises, forming a cylinder of textile material comprising essentially woven asbestos yarn, folding said textile material along a circumferential line, flattening the folded cylinder to form an annular ring so as to dispose the edges on one flat surface intermediate the inner and outer defining edges of the ring and curing the ring thus formed.

3. A method of making friction clutch rings which comprises, forming a cylinder of textile material comprising essentially braided asbestos yarn, folding said textile material along a circumferential line, flattening the folded cylinder to form an annular ring so as to dispose the edges on one flat surface intermediate the inner and outer defining edges of the ring and curing the ring thus formed.

4. A method of making an endless friction clutch ring which comprises, cutting a unit tube from a tube of textile material comprising essentially woven asbestos yarn, folding said unit tube along a circumferential line to form a multiply cylinder and flattening said cylinder into the form of an annular ring so as to dispose the edges on one flat surface intermediate the inner and outer defining edges of the ring.

5. A method of making an endless friction clutch ring which comprises, cutting a unit tube from a tube of textile material comprising essentially braided asbestos yarn, folding said unit tube along a circumferential line to form a multiply cylinder and flattening said cylinder into the form of an annular ring so as to dispose the edges on one flat surface intermediate the inner and outer defining edges of the ring.

6. An endless friction ring of greater width than thickness comprising a unitary piece of asbestos cloth folded along a circumferential line to form a plurality of plies, the facing being frictioned with a binder and cured, and the circumferential edges of said plies being disposed intermediate the width of the ring.

7. An endless friction ring of greater width than thickness comprising a unitary piece of woven asbestos cloth folded along a circumferential line to form a plurality of plies, the facing being frictioned with a binder and cured, and the circumferential edges of said plies being disposed intermediate the width of the ring.

8. An endless friction ring of greater width than thickness comprising a unitary piece of braided asbestos cloth folded along a circumferential line to form a plurality of plies, the facing being frictioned with a binder and cured, and the circumferential edges of said plies being disposed intermediate the width of the ring.

MORTON F. JUDD.